(12) United States Patent
Watanabe et al.

(10) Patent No.: US 9,214,655 B2
(45) Date of Patent: Dec. 15, 2015

(54) POWER STORAGE DEVICE

(75) Inventors: Hirotaka Watanabe, Toyota (JP); Masahiro Imai, Miyoshi (JP)

(73) Assignees: Toyota Jidosha Kabushiki Kaisha, Toyota-shi, Aichi-ken (JP); Kojima Press Industry Co., Ltd, Toyota-shi, Aichi-ken (JP)

( * ) Notice: Subject to any disclaimer, the term of this patent is extended or adjusted under 35 U.S.C. 154(b) by 248 days.

(21) Appl. No.: 13/992,257

(22) PCT Filed: Dec. 12, 2011

(86) PCT No.: PCT/IB2011/002993
§ 371 (c)(1),
(2), (4) Date: Jun. 7, 2013

(87) PCT Pub. No.: WO2012/080805
PCT Pub. Date: Jun. 21, 2012

(65) Prior Publication Data
US 2013/0273397 A1    Oct. 17, 2013

(30) Foreign Application Priority Data

Dec. 15, 2010  (JP) ................................ 2010-278859

(51) Int. Cl.
| H01M 2/10 | (2006.01) |
| H01M 10/615 | (2014.01) |
| H01M 10/6557 | (2014.01) |
| H01M 10/6561 | (2014.01) |
| H01M 10/6566 | (2014.01) |
| H01M 10/613 | (2014.01) |
| H01M 10/647 | (2014.01) |

(52) U.S. Cl.
CPC .......... *H01M 2/1016* (2013.01); *H01M 2/1022* (2013.01); *H01M 2/1072* (2013.01); *H01M 2/1077* (2013.01); *H01M 10/613* (2015.04); *H01M 10/615* (2015.04); *H01M 10/6557* (2015.04); *H01M 10/6561* (2015.04); *H01M 10/6566* (2015.04); *H01M 10/647* (2015.04)

(58) Field of Classification Search
None
See application file for complete search history.

(56) References Cited

U.S. PATENT DOCUMENTS

| 6,444,348 B1 | 9/2002 | Saijo et al. |
| 6,761,992 B1 | 7/2004 | Markukawa et al. |
| 2005/0084743 A1 | 4/2005 | Okamoto et al. |
| 2005/0130033 A1 | 6/2005 | Iwamura et al. |

(Continued)

FOREIGN PATENT DOCUMENTS

| JP | 2001-68081 | 3/2001 |
| JP | 2002-42753 | 2/2002 |

(Continued)

OTHER PUBLICATIONS

Applicant's Communication in International Application No. PCT/IB2011/002993 (Jul. 10, 2012).

*Primary Examiner* — Cynthia K Walls
(74) *Attorney, Agent, or Firm* — Finnegan, Henderson, Farabow, Garrett & Dunner, LLP (57) ABSTRACT

A power storage device includes a plurality of power storage elements (10) lined up along a predetermined arrangement direction; a dividing member (40) that is made of insulating material and arranged between two adjacent power storage elements; a pair of end plates (31) that sandwich the plurality of power storage elements, and apply restraining force thereto, in the arrangement direction; and a metal connecting member (32) that extends in the arrangement direction and is fixed to the pair of end plates. The dividing member includes a retaining portion (42) that is positioned between the power storage elements and the connecting member, and that retains the connecting member.

15 Claims, 8 Drawing Sheets

(56) References Cited

U.S. PATENT DOCUMENTS

| | | |
|---|---|---|
| 2010/0104927 A1 | 4/2010 | Albright |
| 2010/0112424 A1 | 5/2010 | Hayashi |
| 2010/0167115 A1 | 7/2010 | Okada et al. |

FOREIGN PATENT DOCUMENTS

| | | |
|---|---|---|
| JP | 2003-346754 | 12/2003 |
| JP | 2004-22338 | 1/2004 |
| JP | 3595346 | 12/2004 |
| JP | 2007-280858 | 10/2007 |
| JP | 2008-16259 | 1/2008 |
| JP | 2008-103248 | 5/2008 |
| JP | 2008-159439 | 7/2008 |
| JP | 2008-192551 | 8/2008 |
| JP | 2008-277085 | 11/2008 |
| JP | 2009-21067 | 1/2009 |
| JP | 2009-259455 | 11/2009 |
| JP | 2010-157450 | 7/2010 |
| JP | 2010-257652 | 11/2010 |
| WO | WO 99/40637 A1 | 8/1999 |

POWER STORAGE DEVICE

CROSS-REFERENCE TO RELATED APPLICATIONS

This application is a national phase application of International Application No. PCT/IB2011/002993, filed Dec. 12, 2011, and claims the priority of Japanese Application No. 2010-278859, filed Dec. 15, 2010, the content of both of which is incorporated herein by reference.

BACKGROUND OF THE INVENTION

1. Field of the Invention

The invention relates to a power storage device that includes a mechanism that applies restraining force to a plurality of power storage elements arranged lined up in one direction.

2. Description of Related Art

Technology is known in which a battery pack is formed by lining up a plurality of single cells in one direction. Also, restraining force is applied to the plurality of single cells using a restraining mechanism. The restraining force is force that squeezes the plurality of single cells together in the direction in which they are arranged (hereinafter referred to as the "arrangement direction").

The restraining mechanism includes a pair of end plates that sandwich the plurality of single cells, and a band that is fixed to the pair of end plates. The band extends in the arrangement direction of the plurality of single cells, and is able to apply restraining force to the plurality of single cells by the ends of the band being fixed to the pair of end plates.

In the restraining mechanism described above, the band is sometimes formed of metal in order to ensure restraining force with respect to the single cells. In this case, it is preferable to ensure that the band is insulated from the single cells. More specifically, an insulating member is preferably provided between band and the single cells. However, when an insulating member is provided between the band and the single cells, the number of parts ends up increasing.

SUMMARY OF THE INVENTION

One aspect of the invention relates to a power storage device. This power storage device includes a plurality of power storage elements lined up along a predetermined arrangement direction; a dividing member that is made of insulating material and arranged between two adjacent power storage elements; a pair of end plates that sandwich the plurality of power storage elements, and apply restraining force thereto, in the arrangement direction; and a metal connecting member that extends in the arrangement direction and is fixed to the pair of end plates. The dividing member includes a retaining portion that is positioned between the power storage elements and the connecting member, and that retains the connecting member.

In this aspect, the retaining portion of the two dividing members that are adjacent in the arrangement direction may contact each other while lined up along the connecting member. Also, the retaining portion may surround the connecting member in a plane orthogonal to the arrangement direction. According to this structure, all of the surfaces of the connecting member are able to be covered by the retaining portion of a plurality of dividing members.

Also, in the structure described above, the retaining portion may be formed in a shape that follows an outer surface of the connecting member. According to this structure the connecting member can be covered without increasing the size of the retaining portion. Also, in the structure described above, the retaining portion may include a protruding portion that sandwiches the connecting member, on an inner wall surface that faces the connecting member. According to this structure, a plurality of retaining portions can be positioned with respect to the connecting member.

Moreover, in the structure described above, two of the retaining portions that are adjacent in the arrangement direction may each include an engaging portion that engages with each other, and each engaging portion may include a surface that extends in the arrangement direction. According to this structure, the contact area of two retaining portions can be increased, and foreign matter such as water droplets can be inhibited from getting into the retaining portion (i.e., the arranging space of the connecting member).

Also, in the structure described above, a flow path for a heat exchange medium that can be used to regulate the temperature of the power storage elements may be formed using the retaining portion and a case that forms an exterior of the power storage device. Gas or fluid may be used as the heat exchange medium. Air may be used as the gas. The heat exchange medium flow passage may be an intake passage for supplying heat exchange medium to the power storage elements, or a discharge passage for discharging heat exchange medium after heat exchange. Accordingly to this structure, forming the passage for the heat exchange medium enables the chamber for forming a passage for the heat exchange medium can be omitted, and thus enables the number of parts to be reduced.

Moreover, in the structure described above, a guide rib (41c) that guides foreign matter headed toward the retaining portion away from the retaining portion may be provided on the dividing member. According to this structure, foreign matter is able to be inhibited from reaching the retaining portion. The two retaining portions only contact one another, so it is possible that foreign matter may end up getting into the connecting portion of the two retaining portions. Using the guide rib thus enables foreign matter to be inhibited from getting in.

In the structure described above, a drain hole for draining the foreign matter guided by the guide rib outside the dividing member may be formed in the dividing member. According to this structure, foreign matter can be efficiently discharged outside the dividing member.

In the structure described above, when the power storage elements each include a valve for discharging gas produced inside the power storage elements, a cover that protrudes to a position facing the valve and covers the valve may be provided on the dividing member. According to this structure, the valve can be protected by using the cover. In the structure described above, the cover may include a region away from the valve, and a tip end portion that extends toward the valve. According to this structure, a space between the cover and the valve can be ensured by extending the tip end portion of the cover toward the valve.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
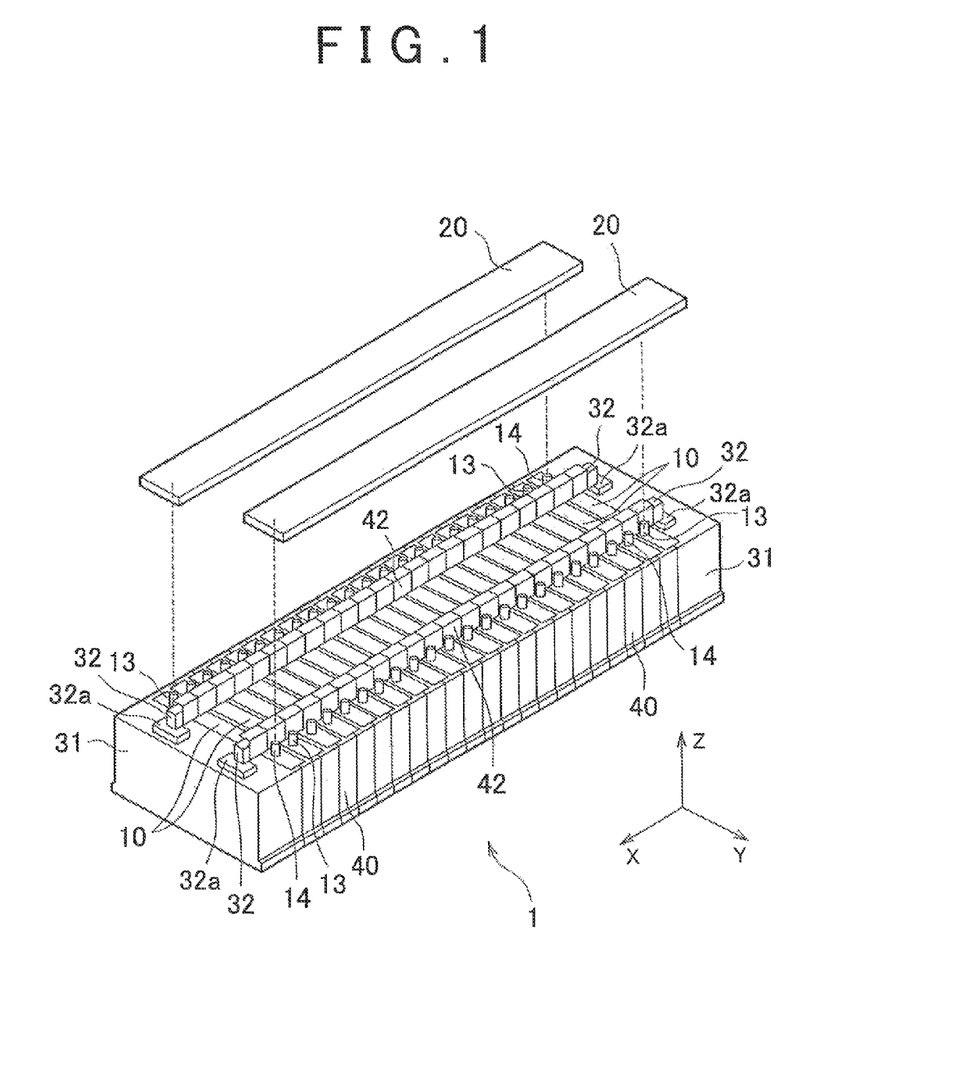
FIG. 1 is an external view of a battery pack according to a first example embodiment of the invention.

A battery pack 1 according to a first example embodiment of the invention will now be described with reference to FIG. 1. FIG. 1 is an external view of the battery pack of this example embodiment. In FIG. 1, the X axis, the Y axis, and the Z axis are orthogonal to each other. In this example embodiment, the Z axis is an axis that corresponds to the vertical direction. The relationships among the X axis, the Y axis, and the Z axis are the same for the other drawings as well. The battery pack 1 may serve as the power storage device of the invention.

The battery pack 1 has a plurality of single cells 10. The plurality of single cells 10 are lined up in the X direction. The number of single cells 10 may be set appropriately based on the required output and the like of the battery pack 1. Secondary batteries such as nickel-metal hydride batteries or lithium ion batteries may be used for the single cells 10. Also, electric double layer capacitors (capacitors) may be used instead of secondary batteries. In this example embodiment, the plurality of single cells 10 are lined up in the X direction, but the invention is not limited to this. More specifically, a plurality of single cells 10 may be used to form a single battery module, and a plurality of battery modules may be lined up in the X direction. The single cells 10 may serve as the power storage elements of the invention.

Figure 2:
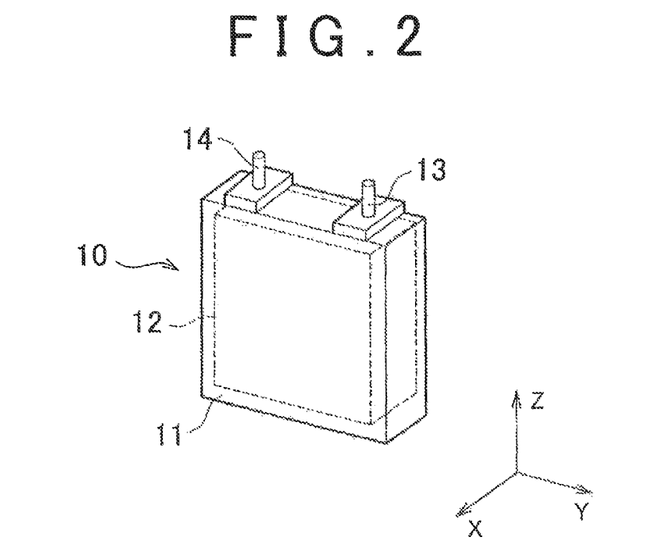
FIG. 2 is an external view of a single cell according to the first example embodiment.

As shown in FIG. 2, each single cell 10 includes a battery case 11 and a power generating element 12 housed in the battery case 11. The power generating element 12 is an element that charges and discharges. The power generating element 12 may be formed by a positive element, a negative element, and a separator (including an electrolyte solution) arranged between the positive element and the negative element. A solid electrolyte may also be used instead of the electrolyte solution. The positive element forms a layer that includes positive active material, on a surface of a collector plate. The negative element forms a layer that includes negative active material, on a surface of the collector plate.

A positive element 13 and a negative element 14 are provided on an upper surface of the battery case 11 in the Z direction. The positive element 13 is electrically connected to the positive element of the power generating element 12. The negative element 14 is electrically connected to the negative element of the power generating element 12.

The plurality of single cells 10 that are arranged lined up in the X direction are electrically connected in series. More specifically, the positive element 13 of one single cell 10 is electrically connected to the negative element 14 of another single cell 10 by the bus bar. Also, the negative element 14 of one single cell 10 is electrically connected to the positive element 13 of another single cell 10 by a bus bar. In this example embodiment, two bus bar modules 20 are used to electrically connect the plurality of single cells 10 together. Each bus bar module 20 has a plurality of bus bars and a resin plate that supports the plurality of bus bars.

A pair of end plates 31 are arranged, one at each end of the battery pack 1 in the X direction. A band 32 that extends in the X direction is fixed to the pair of end plates 31. The band 32 is made of metal. In this example embodiment, two bands 32 are arranged on the upper surface of the battery pack 1 in the Z direction. Also, although not shown in FIG. 1, two bands 32 are also arranged on the lower surface of the battery pack 1 in the Z direction. Fixing portions 32a provided on both ends of each band 32 are fixed to the end plates 31. The method by which the end plates 31 are fixed to the fixing portions 32a may be fastening using bolts, for example. The band 32 may serve as the connecting member of the invention.

Restraining force may be applied to the plurality of single cells 10 that form the battery pack 1 by fixing the bands 32 to the pair of end plates 31. The restraining force is force that squeezes the plurality of single cells 10 together in the X direction. Applying restraining force to the single cells 10 makes it possible to inhibit the single cells 10 from expanding.

In this example embodiment, two bands 32 are arranged on the upper surface of the battery pack 1 in the Z direction and two bands 32 are arranged on the lower surface of the battery pack 1 in the Z direction, but the invention is not limited to this. The number of bands 32 that are arranged on the upper and lower surfaces of the battery pack 1 in the Z direction may be set appropriately. That is, the number of bands 32 is not limited as long as restraining force is able to be applied to the single cells 10 by fixing the bands 32 to the pair of end plates 31.

A dividing member 40 is arranged between two adjacent single cells 10 in the X direction. The dividing member 40 may be formed by insulating material such as resin, such that two adjacent single cells 10 in the X direction are insulated from each other.

Figure 3:
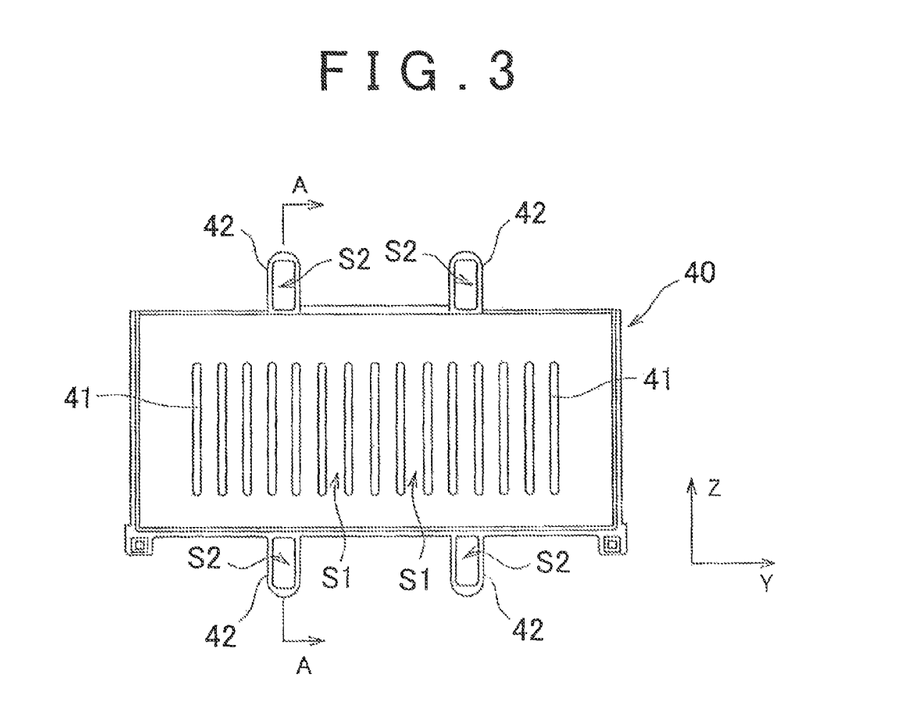
FIG. 3 is a front view of a dividing member according to the first example embodiment.
Figure 4:
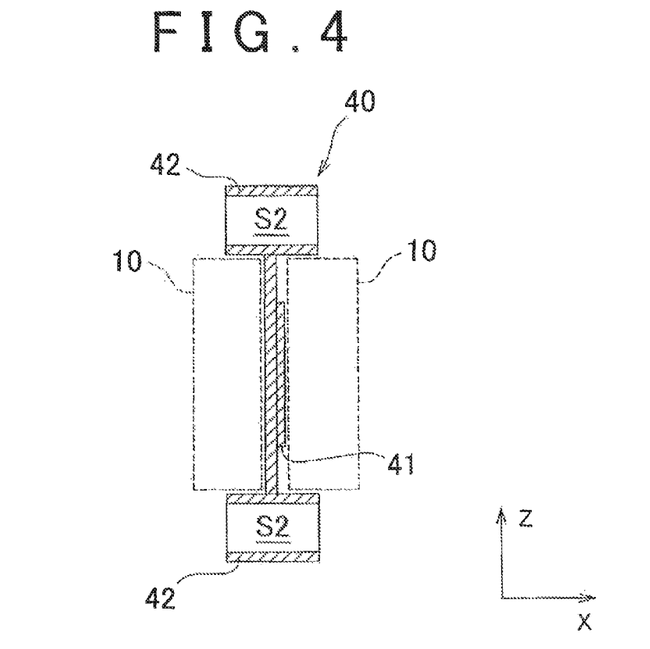
FIG. 4 is a sectional view taken along line A-A in FIG. 3, of the dividing member according to the first example embodiment.

FIG. 3 is a view of the dividing member 40 from the X direction, and FIG. 4 is a sectional view taken along line A-A in FIG. 3.

The dividing member 40 has a plurality of ribs 41 that protrude in the X direction. The plurality of ribs 41 are provided on a wall surface of the dividing member 40 that faces the single cell 10 in the X direction. That is, the plurality of ribs 41 are provided protruding in the arrangement direction of the power storage elements, on a wall surface of the dividing member that faces the power storage element. Each rib 41 extends in the Z direction, and the plurality of ribs 41 are lined up in the Y direction. The length of each of the plurality of ribs 41 is shorter than the length of the dividing member in the Z direction, i.e., the vertical direction. The tip ends of the ribs 41 in the X direction contact the single cell 10, such that spaces S1 are formed between the dividing member 40 and the single cell 10. The spaces S1 are spaces through which air for regulating the temperature of the single cell 10 flows. The air may serve as the heat exchange medium of the invention.

The ribs 41 are formed only on one wall surface of the dividing member 40. The wall surface on side opposite the wall surface on which the ribs 41 are formed is formed by a flat surface. In other words, in a structure in which a dividing member 40 is sandwiched between two single cells 10, the ribs 41 are formed on a wall surface of the dividing member 40 that faces one of the single cells 10, and the ribs 41 are not formed on the wall surface of the dividing member 40 that faces the other single cell 10. It should be noted, however, that ribs may also be formed on the wall surfaces of the dividing member 40 that face two single cells 10.

The single cells 10 positioned on both ends of the battery pack 1 in the X direction are each sandwiched between a dividing member 40 and an end plate 31. Of the two end plates 31, one end plate 31 has ribs corresponding to the ribs 41.

The ribs 41 extend in the Z direction. Air for regulating the temperature (i.e., temperature regulating air) advances in the Z direction along the dividing member 40. For example, when supplying temperature regulating air from the Upper surface of the battery pack 1 in the Z direction, this air advances from the upper portion toward the lower portion of the dividing member 40. When air flows through the spaces S1, heat exchange is performed between the air and the single cell 10, thus enabling the temperature of the single cell 10 to be regulated. The air after the temperature has been regulated is then led to a discharge passage provided in the lower surface of the battery pack 1 in the Z direction. On the other hand, when temperature regulating air is supplied from the lower surface of the battery pack 1 in the Z direction, this air advances from the lower portion toward the upper portion of the dividing member 40. The air after the temperature has been regulated is then led to a discharge passage provided in the upper surface of the battery pack 1 in the Z direction.

When the single cell 10 is producing heat, a rise in the temperature of the single cell 10 can be suppressed by leading air for cooling (i.e., cooling air) into the spaces S1. Also, when the single cell 10 is too cold, a decrease in temperature of the single cell 10 can be suppressed by leading air for heating (i.e., heating air) into the spaces S1. Maintaining the temperature of the single cell 10 within a predetermined temperature range makes it possible to inhibit the input/output characteristics of the single cell 10 from deteriorating.

In this example embodiment, air is used to regulate the temperature of the single cell 10, but the invention is not limited to this. That is, a gas other than air may be used, or a liquid may be used. If a liquid is used, an insulating liquid is preferably used. Also, when a liquid is used, the passage through which the liquid flows must be sealed.

Two housing portions 42 are provided on the upper portion of the dividing member 40, and two housing portions 42 are provided on the lower portion of the dividing member 40. The housing portions 42 each have a space S2 through which the corresponding band 32 passes (see FIG. 1). The space S2 is formed in a shape that follows the outer shape of the band 32. Each of these housing portions 42 may serve as a retaining portion of the invention.

As shown in FIG. 4, the housing portions 42 extend in the X direction. When two dividing members 40 are lined up in the X direction, the housing portions 42 of one dividing member 40 contact the housing portions 42 of the other dividing member 40. Connecting the housing portions 42 of the plurality of dividing members 40 together enables the bands 32 that extend in the X direction to be covered by the plurality of housing portions 42.

A manufacturing method of the battery pack 1 of this example embodiment will now be briefly described. First, the single cells 10 and the dividing members 40 are alternately arranged. Accordingly, the housing portions 42 of the plurality of dividing member 40 can be connected together and the bands 32 can be passed through the connected plurality of housing portions 42. Both ends of each of the bands 32 protrude from the passages formed by the housing portions 42, so the bands 32 can be fixed to the end plates 31 by the fixing portions 32a.

In this example embodiment, passages that cover the bands 32 can be formed by simply lining up the dividing members 40. Also, insulation of the bands 32 can be ensured by the housing portions 42 that are formed by insulating material coy the bands 32. The housing portions 42 are part of the dividing members 40, so the plurality of dividing members 40 can be arranged along the bands 32 by passing the bands 32 through the housing portions 42.

Figure 5:
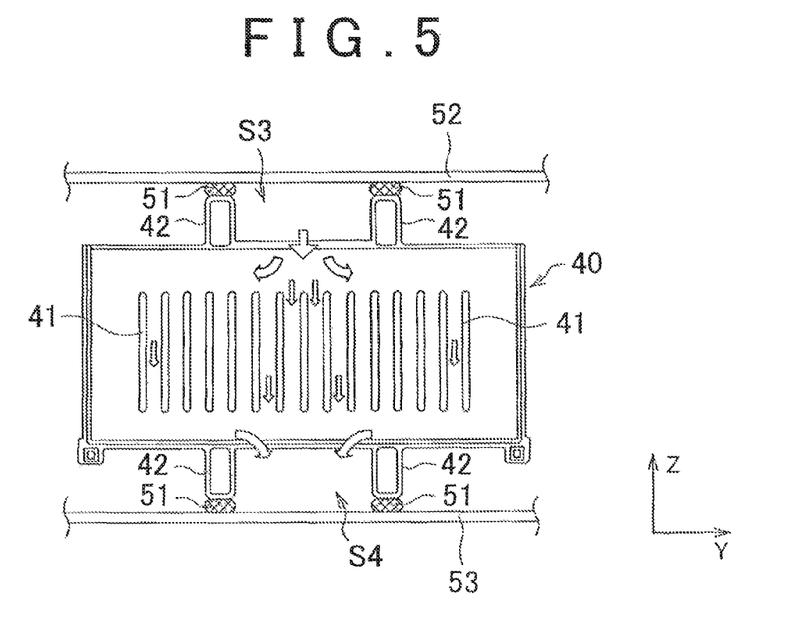
FIG. 5 is a view of an intake passage and a discharge passage according to the first example embodiment.

Meanwhile, as shown in FIG. 5, passages for moving the temperature regulating air can be formed using the housing portions 42. An intake passage S3 for supplying temperature regulating air is provided above the dividing members 40. This intake passage S3 extends in the X direction, and is formed by the two housing portions 42 and an upper case 52. The upper case 52 forms the exterior of the battery pack 1 and, together with a lower case 53 that will be described later, covers the single cells 10 and the dividing members 40. The upper case 52 and the lower case 53 may be made of metal such as aluminum. A seal member 51 is arranged between each housing portion 42 and the upper case 52.

As shown by the arrows in FIG. 5, air that flows through the intake passage S3 flows to the spaces S1 formed between the dividing member 40 and the single cell 10, where it flows along the ribs 41. The air that flows through the spaces S1 flows to a discharge passage S4 provided below the dividing member 40. This discharge passage S4 extends in the X direction and is formed by the two housing portions 42 and the lower case 53. A seal member 51 is arranged between each housing portion 42 and the lower case 53.

Forming the intake passage S3 and the discharge passage S4 using the housing portions 42 enables the number of parts to be reduced, which in turn enables the battery pack 1 to be made smaller. With the structure shown in FIG. 5, the intake passage S3 is provided above the dividing member 40 and the discharge passage S4 is provided below the dividing member 40, but the invention is not limited to this. More specifically, the discharge passage S4 may be provided above the dividing member 40 and the intake passage S3 may be provided below the dividing member 40. In this case, the direction in which the air flows is opposite the direction shown by the arrows in FIG. 5.

Figure 6:
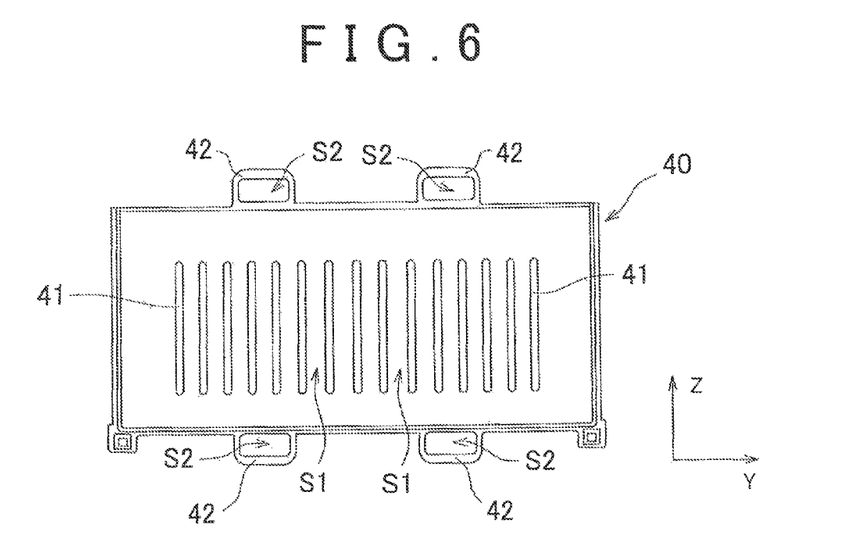
FIG. 6 is a front view of a dividing member according to a modified example of the first example embodiment.

In this example embodiment, as shown in FIG. 3, the length of the spaces S2 of the housing portions 42 in the Z direction is longer than the length of the spaces S2 of the housing portions 42 in the Y direction. The invention is not limited to the structure shown in FIG. 3. That is, the structure shown in FIG. 6 is also possible. In the structure shown in FIG. 6, the length of the spaces S2 of the housing portions 42 in the Y direction is longer than the length of the spaces S2 of the housing portions 42 in the Z direction.

Also in this example embodiment, the bands 32 in which the cross-section orthogonal to the length direction is rectangular are used, but the invention is not limited to this. For example, rods having circular cross-sections may be used instead of the bands 32. In this case, the inner wall surfaces of the housing portions 42 that form the spaces S2 may be formed in shapes that follow the outer peripheries of the rods. The spaces S2 do not have to be formed in shapes that follow the bands 32. That is, the spaces S2 may be any shape as long as the bands 32 are able to pass through them. A rod may serve as the connecting member of the invention.

Figure 7:
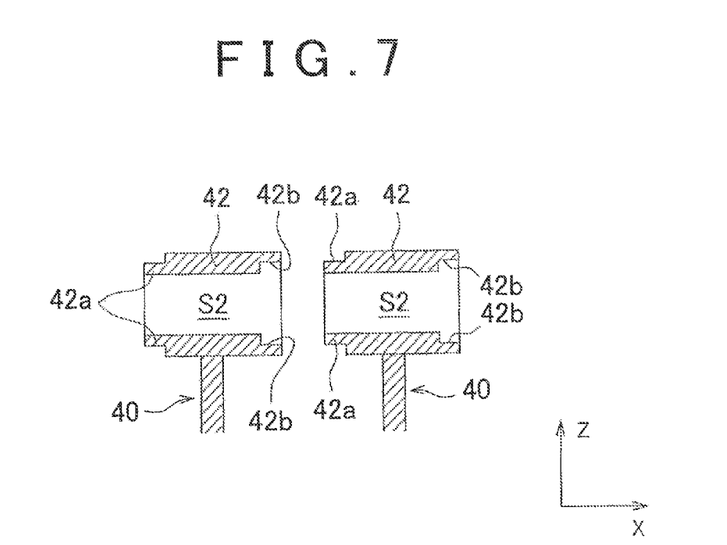
FIG. 7 is a view of the structure of a portion of a dividing member according to another modified example of the first example embodiment.

In this example embodiment, the end portions of the housing portions 42 in the X direction are formed with a flat surface, but the invention is not limited to this. For example, the housing portions 42 may have the structure shown in FIG. 7. In FIG. 7, a protruding portion 42a is formed on one end of the housing portion 42 in the X direction, and a recessed portion 42b is formed on the other end of the housing portion 42 in the X direction. When two of the dividing members 40 are lined up, the protruding portion 42a of one housing portion 42 engages with the recessed portion 42b of the other housing portion 42. The protruding portion 42a and the recessed portion 42b may serve as the engaging portion of the invention.

If the structure shown in FIG. 7 is used, two adjacent dividing members 40 in the X direction can be easily connected together by inserting the protruding portion 42a of one housing portion 42 into the recessed portion 42b of the other housing portion 42. Also, using the protruding portion 42a and the recessed portion 42b enables the contact area of the two housing portions 42 to be increased. As a result, the flow of water or the like at the contact portion of the two housing portions 42 can be suppressed, so the insulating property of the band 32 can be improved.

With the structure shown in FIG. 7, the protruding portion 42a and the recessed portion 42b are formed on opposite ends of the housing portion 42 in the X direction, but the invention is not limited to this. For example, a dividing member 40 that has protruding portions 42a on both ends of the housing portion 42 in the X direction, and a dividing member 40 that has recessed portions 42b on both ends of the housing portion 42 in the X direction may be used. In this case, the plurality of housing portions 42 may be connected together so as to form passages that cover the bands 32, by arranging the two type of dividing members 40 alternately.

The structure that connects two housing portions 42 is not limited to the structure shown in FIG. 7. The end portions of the housing portions 42 in the X direction may be formed with three-dimensional (X, Y, and Z) surfaces instead of being formed by only surfaces in the Y-Z planes. More specifically, of the two housing portions 42, portions that engage together need only have surfaces that extend in the X direction. A surface that extends in the X direction may be a surface that follows the X axis, or a surface that is sloped with respect to the X axis. This kind of structure enables two adjacent housing portions 42 in the X direction to be easily connected, as well as makes it possible to ensure the contact area of the two housing portions 42, and inhibit water or the like from getting in.

With this example embodiment, the bands 32 are arranged on the upper and lower surfaces of the battery pack 1 in the Z direction, but the invention is not limited to this. More specifically, the bands 32 may be arranged on both side surfaces of the battery pack 1 in the Y direction. The bands 32 need only connect the pair of end plates 31 together. The positions in which the bands 32 are arranged may be set as appropriate. Also, the positions of the housing portions 42 provided on the dividing members 40 may be changed according to the positions of the bands 32.

Figure 8:
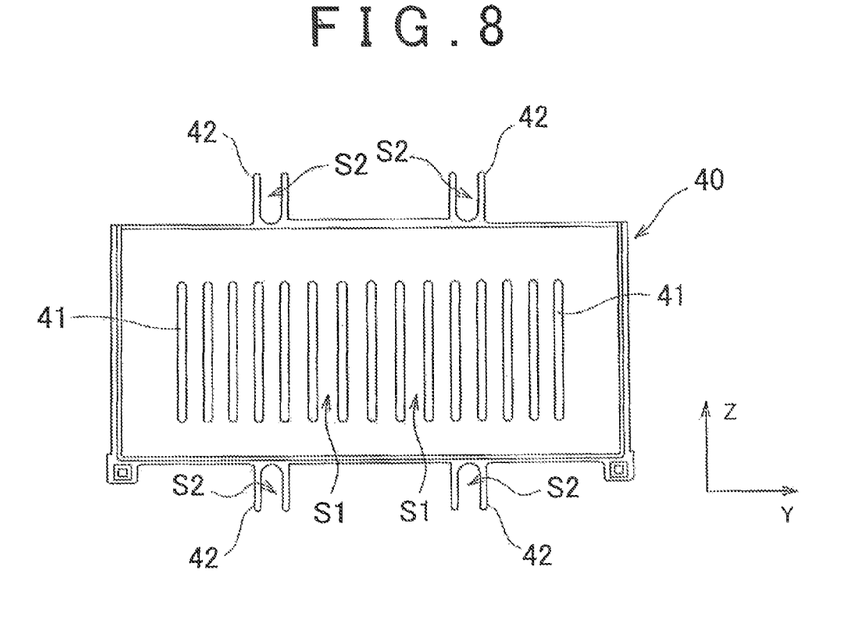
FIG. 8 is a front view of a dividing member according to yet another modified example of the first example embodiment.

With this example embodiment, the housing portions 42 surround the bands 32 within the Y-Z planes, but the invention is not limited to this. That is, the bands 32 may also be retained and insulated from the single cells 10 using a portion of the dividing member 40. More specifically, the structure shown in FIG. 8 may be employed. FIG. 8 is a view of the structure of a dividing member 40 that corresponds to FIG. 3.

As shown in FIG. 8, retaining portions 42 are provided on both the upper and lower surfaces of the dividing member 40 in the Z direction. The retaining portions 42 have the same function as the housing portions 42 described in this example embodiment. The retaining portions 42 have three surfaces corresponding to the bands 32 in the Y-Z plane, and so do not surround the bands 32. With the structure shown in FIG. 8 as well, the bands 32 are able to be insulated from the single cells 10. Here, the shapes of the retaining portions 42 in the Y-Z plane may be set as appropriate.

Meanwhile, with the example embodiment, two adjacent housing portions 42 in the X direction contact one another, but the invention is not limited to this. More specifically, the two housing portions 42 may be separated from each other in the X direction. Also, in this example embodiment, two adjacent housing portions 42 in the X direction contact one another along their entire end surfaces in the X direction, but the invention is not limited to this. More specifically, two housing portions 42 may contact one another at only a portion of their end surfaces in the X direction.

Next, a battery pack according to a second example embodiment of the invention will be described. Members in this example embodiment that have the same function as members described in the first example embodiment will be denoted by like reference characters, and detailed descriptions of these members will be omitted. Hereinafter, mainly the differences from the first example embodiment will be described.

As described in the first example embodiment, after all of the dividing members 40 have been lined up in the X direction, the bands 32 are passed through the plurality of housing portions 42 that are connected together. In this example embodiment, the bands 32 extend in the X direction, so the plurality of housing portions 42 are positioned based on the bands 32. That is, the plurality of dividing members 40 are inhibited from becoming offset, based on the bands 32.

Figure 9:
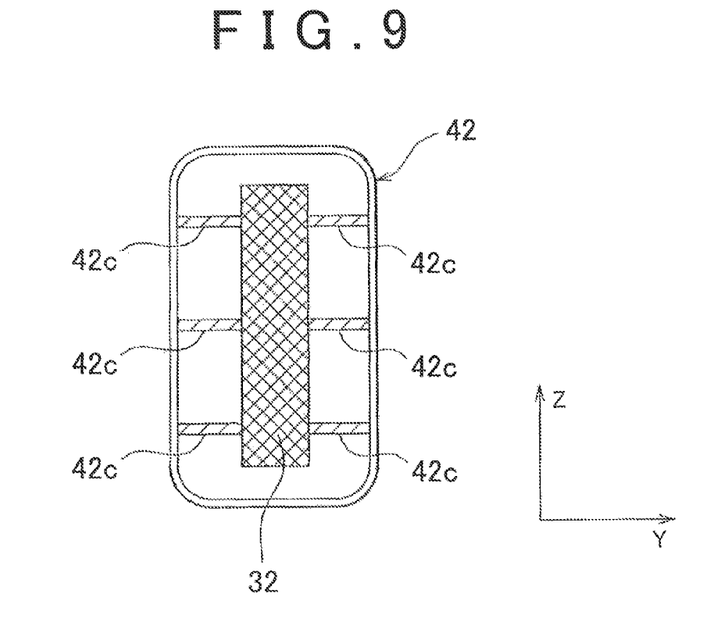
FIG. 9 is a view of the internal structure of a housing portion according to a second example embodiment of the invention.
Figure 10:
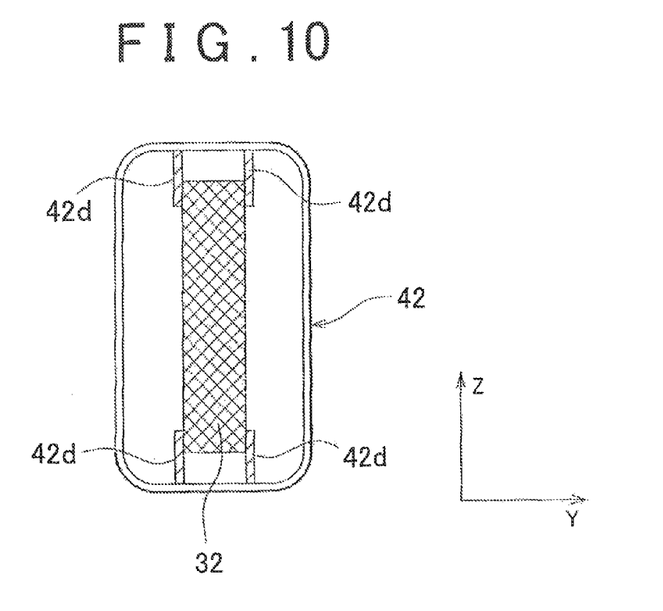
FIG. 10 is a view of the internal structure of a housing portion according to a modified example of the second example embodiment.
Figure 11:
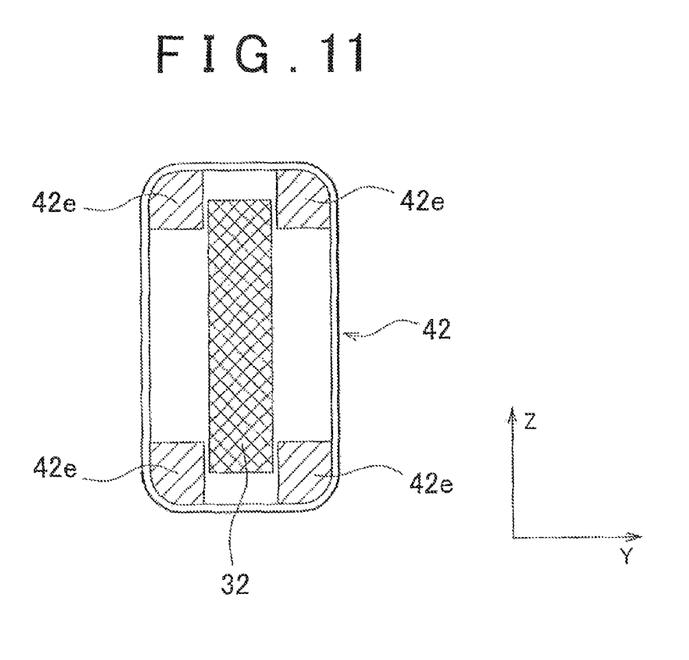
FIG. 11 is a view of the internal structure of a housing portion according to another modified example of the second example embodiment.

In this example embodiment, protruding portions are provided on the inner wall surfaces of the housing portions 42, so the plurality of housing portions 42 are positioned based on the bands 32. The structures shown in FIGS. 9 to 11 are also conceivable as structures that provide protruding portions on the inner wall surfaces of the housing portions 42. FIGS. 9 to 11 are enlarged views (that correspond to FIG. 3) of a housing portion 42 viewed from the X direction. Although FIGS. 9 to 11 show a housing portion 42 provided on an upper portion of the dividing member 40, the housing portion 42 provided on the lower portion of the dividing member 40 is the same.

The structures shown in FIGS. 9 to 11 are only examples. Other structures are also possible as long as protruding portions that contact the bands 32 are provided inside the housing portions 42.

In the structure shown in FIG. 9, a plurality of protruding portions 42c that protrude in the Y direction are provided on the inner wall surface of the housing portion 42. The plurality of protruding portions 42c are arranged in positions sandwiching the band 32 housed in the housing portion 42. The plurality of protruding portions 42c arranged on both sides of the band 32 are lined up in the Z direction.

The number of protruding portions 42c arranged on both sides of the band 32 may be set as appropriate. Here, as shown in FIG. 9, the number of protruding portions 42c arranged on one side of the band 32 may be the same as the number of protruding portions 42c arranged on the other side of the band 32. Alternatively, the number of protruding portions 42c arranged on one side of the band 32 may be different from the number of protruding portions 42c arranged on the other side of the band 32.

In the structure shown in FIG. 10, a plurality of protruding portions 42d that protruded in the Z direction are provided on the inner wall surface of the housing portion 42. A pair of protruding portions 42d arranged on the upper portion of the housing portion 42 sandwich the band 32 in the Y direction. Also, a pair of protruding portions 42d arranged on the lower portion of the housing portion 42 sandwich the band 32 in the Y direction. The housing portion 42 is able to be positioned along the band 32 using these two pairs of protruding portions 42d.

In the structure shown in FIG. 11, a protruding portion 42e is provided on each of the four corner portions of the housing portion 42. The two protruding portions 42e positioned on the upper side of, the housing portion 42 are arranged in positions sandwiching the band 32 in the Y direction, and the two protruding portions 42e positioned on the lower side of the housing portion 42 are arranged in positions sandwiching the band 32 in the Y direction. The housing portion 42 is able to be positioned along the band 32 using these four protruding portions 42e.

Next, a battery pack according to a third example embodiment of the invention will be described. Members in this example embodiment that have the same function as members described in the first example embodiment will be denoted by like reference characters, and detailed descriptions of those members will be omitted. Hereinafter, mainly the differences from the first and second example embodiments will be described.

Figure 12:
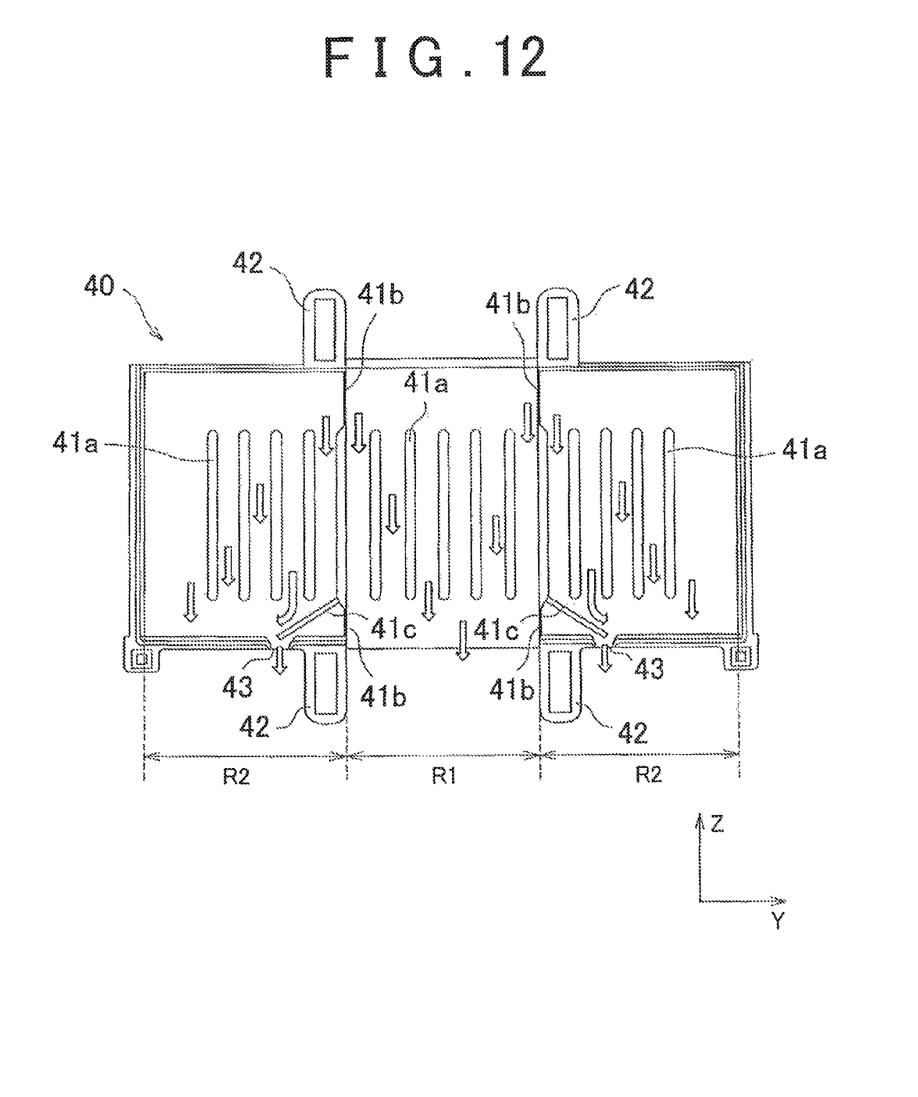
FIG. 12 is a front view of a dividing member according to a third example embodiment of the invention.

FIG. 12 is a view of the dividing member 40 used in this example embodiment as viewed from the X direction. The dividing member 40 has first ribs 41a and second ribs 41b. The first ribs 41a correspond to the ribs 41 described in the first example embodiment and extend in the Z direction. Neither end of the first ribs 41a in the Z direction extends to the outer edge of the dividing member 40.

The second ribs 41b protrude in the X direction, and the tip ends of the second ribs 41b in the X direction contact the single cell 10. Also, the second ribs 41b extend to the upper and lower portions of the dividing member 40, and divide the dividing member 40 into three regions R1 and R2. The first region R1 is a region that is sandwiched between two second ribs 41b, and forms a space through which temperature regulating air flows. The arrows shown in the first region R1 indicate the direction in which air flows. Also, in the first region R1, a plurality of first ribs 41a are lined up in the Y direction. A plurality of the first ribs 41a are also lined up in the Y direction in the second regions R2 as well.

The second regions R2 are regions that are surrounded by a second rib 41b and the outer edge of the dividing member 40. Temperature regulating air does not enter these second regions R2. That is, the spaces corresponding to the second regions R2 are surrounded by the dividing member 40 and the single cell 10. Also, a drain hole 43 is formed in the lower portion of the dividing member 40 in each second region R2. This drain hole 43 may be used to drain water droplets out of the dividing member 40, as will be described later.

A guide rib 41c is provided in each second region R2. This guide rib 41c protrudes in the X direction, and a tip end of the guide rib 41c in the X direction contacts the single cell 10. Also, the guide rib 41c is positioned above the housing portion 42 provided on the lower portion of the dividing member 40, and is slanted with respect to the Z direction. More specifically, one end of the guide rib 41c that is positioned above is connected to the second rib 41b, and the other end of the guide rib 41c that is positioned below is positioned above the drain hole 43.

Condensation may form in the second region R2 depending on the outside environment, such as the air temperature and humidity. If condensation forms, water droplets may run downward and reach the housing portion 42 provided on the lower portion of the dividing member 40. As described in the first example embodiment, two adjacent housing portions 42 in the X direction are only contacting one another, so it is possible that the water droplets may end up getting into the connecting portion of the two housing portions 42.

In this example embodiment, water droplets are led away from the housing portion 42 using the guide rib 41c. As a result, it is possible to inhibit water droplets from getting into the connecting portion of the two housing portions 42. In FIG. 12, the arrows shown in the second regions R2 indicate the direction in which the water droplets run. When water droplets adhere to the second region R2 of the dividing member 40, they run downward along the first ribs 41a and the second rib 41b. In the region where the guide rib 41c is not provided, water droplets fall onto the lower portion of the dividing member 40. Meanwhile, water droplets that have reached the guide rib 41c run along the guide rib 41c and are led to the drain hole 43. As a result, water droplets pass through the drain hole 43 and are drained out of the dividing member 40.

In this example embodiment, the guide rib 41c is formed in the shape shown in FIG. 12, but the invention is not limited to this as long as the water droplets that fall onto the housing portion 42 can be led away from the housing portion 42. Based on this, the shape of the guide rib 41c can be set as appropriate.

Figure 13:
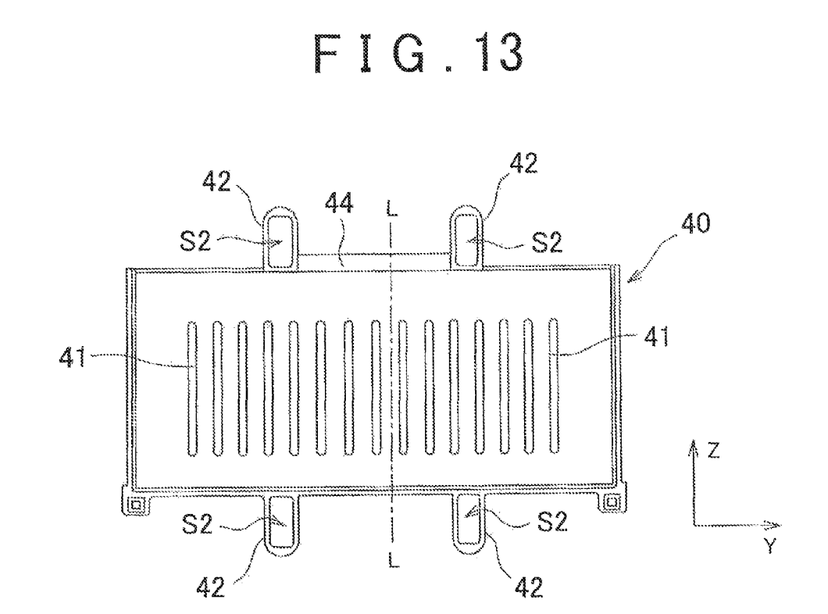
FIG. 13 is a front view of a dividing member according to a fourth example embodiment of the invention.
Figure 14:
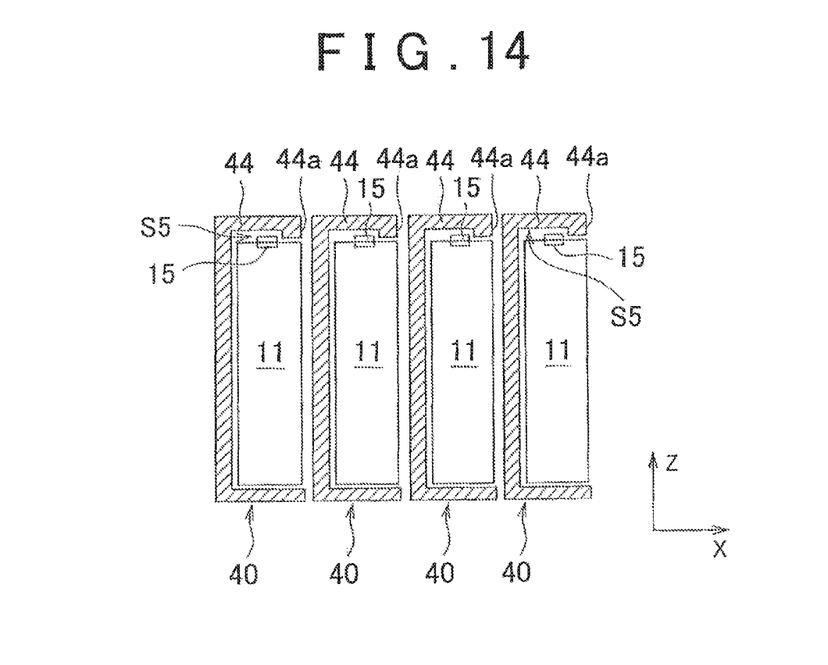
FIG. 14 is a sectional view of the battery pack when cut along line L-L in FIG. 13.

Next, a battery pack according to a fourth example embodiment of the invention will be described. Members in this example embodiment that have the same function as members described in the first example embodiment will be denoted by like reference characters, and detailed descriptions of those members will be omitted. Hereinafter, mainly the differences from the first example embodiment will be described. FIG. 13 is a view of a dividing member 40 used in this example embodiment when viewed from the X direction, and FIG. 14 is a sectional view of the battery pack when cut along line L-L in FIG. 13.

A safety valve 15 is provided on the upper surface of a battery case 11 in the Z direction. This safety valve 15 is used to discharge gas produced inside the battery case 11 outside of the battery case 11. When gas is produced inside the battery case 11, the pressure inside the battery case 11 rises. In response, the safety valve 15 changes from closed to open, such that the gas can be discharged outside of the battery case 11. This safety valve 15 may serve as the valve of the invention.

A so-called destruction valve or a so-called return type valve may be used as the safety valve 15. A destruction valve is a valve that plastically deforms from closed to open, and does not return from open to closed. A return type valve is a value that changes between closed and open according to the internal pressure and external pressure of the battery case 11.

The dividing member 40 has a cover 44. As shown in FIG. 13, the cover 44 is positioned between the two housing portions 42 provided on the upper portion of the dividing member 40, and is connected to these two housing portions 42. Also, the cover 44 protrudes in the X direction and covers the safety valve 15 provided on the upper surface of the single cell 10 in the Z direction. A tip end portion 44a of the cover 44 extends downward, such that a space S5 is formed between the safety valve 15 and the cover 44.

The space S5 becomes a space when the safety valve 15 is operated. If the cover 44 is too close to the safety valve 15, the cover 44 will prevent the safety valve 15 from operating, making it difficult for the safety valve 15 to change from closed to open. In this example embodiment, operation of the safety valve 15 is ensured by providing the space S5.

According to this example embodiment, the safety valve 15 is able to be protected by providing the cover 44. For example, the cover 44 can prevent temperature regulating air from directly reaching the safety valve 15. As described in the first example embodiment, the temperature regulating air flows between the dividing member 40 and the single cell 10. For example, the air is able to flow from the lower portion toward the upper portion of the dividing member 40, or able to flow from the upper portion toward the lower portion of the dividing member 40. In this type of structure, the air would directly reach the safety valve 15 if the cover 44 were not provided.

The space S5 is able to be formed by having the cover 44 be away from the safety valve 15, so the tip end portion 44a of the cover 44 does not need to extend downward. If the tip end portion 44a extends downward as it does in this example embodiment, then when external force is applied to the cover 44, the tip end portion 44a will contact the upper surface of the single cell 10 in the Z direction, so that the space S5 can continue to be ensured.

The invention claimed is:

1. A power storage device comprising:
a plurality of power storage elements lined up along a predetermined arrangement direction;
a dividing member that is made of insulating material and arranged between two adjacent power storage elements;
a pair of end plates that sandwich the plurality of power storage elements, and apply restraining force thereto, in the arrangement direction; and
a metal connecting member that extends in the arrangement direction and is fixed to the pair of end plates, wherein
the dividing member includes a retaining portion that is positioned between the power storage elements and the connecting member, and that retains the connecting member, wherein
the retaining portion surrounds the connecting member in a plane orthogonal to the arrangement direction, and wherein
the retaining portions of the two dividing members that are adjacent in the arrangement direction contact each other while lined up along the connecting member.

2. The power storage device according to claim 1, wherein the retaining portion is formed in a shape that follows an outer surface of the connecting member.

3. The power storage device according to claim 1, wherein two of the retaining portions that are adjacent in the arrangement direction each have an engaging portion that engages with each other, and each engaging portion includes a surface that extends in the arrangement direction.

4. The power storage device according to claim 1, wherein the retaining portion includes a protruding portion that sandwiches the connecting member, on an inner wall surface of the retaining portion that faces the connecting member.

5. The power storage device according to claim 1, further comprising a case that forms an exterior of the power storage device, wherein the retaining portion and the case form a flow passage for a heat exchange, medium used to regulate a temperature of the power storage elements.

6. The power storage device according to claim 1, wherein the dividing member includes a guide rib that guides foreign matter headed toward the retaining portion away from the retaining portion.

7. The power storage device according to claim 6, wherein the dividing member includes a drain hole for draining the foreign matter guided by the guide rib outside the dividing member.

8. The power storage device according to claim 1, wherein the power storage elements each have a valve for discharging gas produced inside the power storage elements, and the dividing member includes a cover that protrudes to a position facing the valve and covers the valve.

9. The power storage device according to claim 8, wherein the cover includes a region away from the valve, and a tip end portion that extends toward the valve.

10. The power storage device according to claim 1, further comprising fixing portions provided on both ends of the connecting member, wherein the connecting member is fixed to the end plates by the fixing portions.

11. The power storage device according to claim 1, wherein the dividing member includes a plurality of ribs, and the plurality of ribs are provided protruding in the arrangement direction of the power storage elements, on a wall surface of the dividing member that faces the power storage elements.

12. The power storage device according to claim 11, wherein of the end plates, one end plate includes ribs that correspond to the plurality of ribs provided on the dividing member.

13. The power storage device according to claim 11, wherein a vertical length of the plurality of ribs is shorter than a vertical length of the dividing member.

14. The power storage device according to claim 1, wherein the retaining portion defines a passage, and the connecting member is at least partially disposed within the passage.

15. The power storage device according to claim 1, wherein the connecting member is positioned on a top surface of the power storage device.

* * * * *